Aug. 24, 1965 P. FOMBONNE 3,202,994
SYSTEMS FOR DETERMINING THE ELEVATION ANGLE
AND AZIMUTH OF A BODY
Filed July 26, 1962 4 Sheets-Sheet 1

United States Patent Office 3,202,994
Patented Aug. 24, 1965

3,202,994
SYSTEMS FOR DETERMINING THE ELEVATION ANGLE AND AZIMUTH OF A BODY
Paul Fombonne, Paris, France, assignor to C.S.F.-Compagnie Generale de Telegraphie Sans Fil, a corporation of France
Filed July 26, 1962, Ser. No. 212,554
Claims priority, application France, Aug. 11, 1961, 870,661
4 Claims. (Cl. 343—106)

The present invention relates to systems for determining the elevation angle and the azimuth of a body. More particularly, the invention provides a system for allowing a moving body to determine its elevation angle or azimuth by means of signals transmitted by a single stationary transmitter.

Accordingly to the invention a transmitting station, located at the origin of said frame of reference, comprises: means for scanning a space portion, according to said angular co-ordinate, with a beam which is at every instant of the scanning substantially symmetrical with respect to an axial surface of maximum radiation; means for generating a wave which is frequency modulated as a function of the instantaneous value of said angular co-ordinate of said surface; means for modulating said frequency modulated wave on a carrier wave; and means for feeding said modulated carrier wave to said scanning means; and a receiver, located aboard said moving body, comprises: means for receiving said modulated carrier wave during the time interval corresponding to the sweeping of said body by said beam; means for demodulating said carrier wave to obtain said frequency modulated wave; and means for deriving from said frequency modulated wave a signal which is a function of the instantaneous frequency of said frequency modulated wave at the intermediate instant of said time interval.

The instantaneous frequency at this intermediate instant corresponds to the actual value of said angular co-ordinate of the moving body.

The signal, which is a function of this instantaneous frequency may be an error signal between this frequency and a frequency corresponding to a desired value of said angular co-ordinate, in which case it may be used in an automatic pilot device; it may also be an error signal between the aforesaid instantaneous frequency and the operating frequancey of a variable oscillator intended to reproduce this instantaneous frequency and serve as an indicator.

The invention will be best understood from the following description and appended drawings, wherein.

The invention is described by way of example with reference to a situation where an airplane has to know constantly its angle of elevation in view of an impending landing. The numerical values given are of course not to be considered as limitative in any manner.

A transmitter E, located at the entrance of the landing lane radiates a lobe, the aperture in elevation of which, in any azimuth plane with the required azimuthal coverage, is 1° at 3 db below the maximum on each side of the maximum radiation direction in the azimuth plane considered.

It is assumed that the scanning is effected without rotation in azimuth, and that, consequently, the volume covered in azimuth is limited in the horizontal direction by the width of the lobe for which the above mentioned condition concerning the radiation pattern is observed which width may be, for example, 10° on each side of the central azimuth plane.

It will also be assumed that the total aperture of the lobe in elevation does not exceed 2° on each side of the maximum radiation direction.

This lobe scans, in elevation, a space volume defined by two planes respectively inclined by 2° and 22° to the horizontal plane with respect to which the elevation is to be determined. The indicated angles of 2° and 22° correspond to the limits of the displacement of the axis of the central azimuth section of the lobe.

The maximum radiation direction for a given azimuth plane through the lobe will henceforth be called the "lobe axis for this azimuth" and the axis corresponding to the central plane of the lobe in azimuth will be henceforth called "the lobe axis." The locus of the lobe axes of the various azimuth planes through the lobe will be called "the axial surface."

It should be noted that two main antenna types may be used, depending on the shape of the "axial surface":

(a) This surface may be conical and may illuminate either the whole of the horizon in azimuth or it may be limited by two vertical planes passing through the cone axis; in this case, during the displacement of the lobe, the apex angle of the cone varies and all the lobe axes have at any instant the same elevation angle which is the "elevation angle of the lobe."

(b) The axial surface is a plane surface and is limited by two vertical planes passing through the origin of the lobe; during the motion of the lobe, the elevtaion angle of the axial plane, which is that of the maximum radiation direction in given azimuth plane, normally the central azimuth plane, varies. This elevation angle is considered as the elevation angle of the lobe. In this case, the elevation angle of the lobe axis in an azimuth plane other than the central azimuth plane is slightly different from that of the lobe, but this difference may be disregarded if the sector covered is not too large.

The scanning is effected at a constant speed during the upward motion. The elevation angle S of the lobe axis is defined in degrees during this upward motion by the following law:

$$S = b(t - t_1) + 2$$

where $b$ is a constant, $t$ the time in seconds, and $t_1$ the initial time of the upward motion.

The high-frequency carrier is, in this example, amplitude modulated only during the ascending motion of the lobe by a low-frequency signal B of constant amplitude, which is frequency modulated as a function of the angle of elevation S of the lobe axis according to the law $$f = F(1 + aS)$$

$a$ being constant and F the instantaneous frequency.

Since the carrier, in the present example, is not modulated during the downward motion, the latter may or may not be effected with the same speed as the upward motion. It will be assumed here that this speed is the same the time necessary for performing the ascending or descending motion being of say 1/10 of a second, $b$ being in this case equal to 200.

The instantaneous frequency of signal B varies between 50 and 150 kc./s., which corresponds to $F = 40$ kc./s, and $a = 1/8$, angle S being expressed in degrees.

Figure 1:
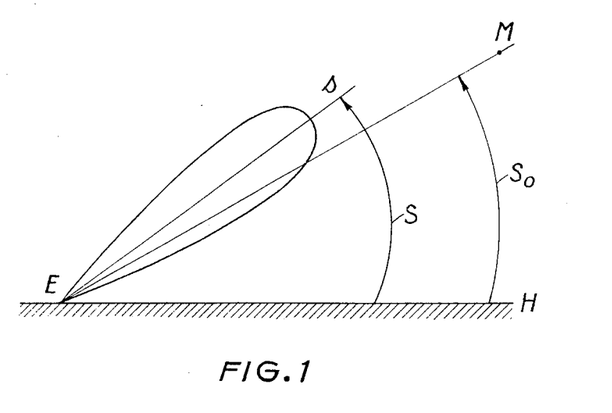
FIG. 1 illustrates diagrammatically the principle of the invention.

FIG. 1 shows transmitter E with the vertical plane passing through the lobe axis and a moving body M assumed to be in this plane.

The angle of elevation $S$, as a function of which signal B is modulated, is the angle between the axis $Es$ of the lobe and the horizontal plane EH. In the figure, both the instantaneous angle $S$, which in the example considered is lower than 22°, and the lobe aperture in elevation have been exaggerated for the sake of the clearness of the drawing. The angle of elevation of body M is designated by $S_0$.

Body M, for example an airplane, will know its elevation, if it can determine the instantaneous frequency of signal B at the instant where it is swept by the axial surface of the lobe.

The reasoning is the same if body M is not located in the vertical plane containing the lobe axis, it being understood that the information thus communicated to it is that of the lobe axis at this instant, and that, where an aerial wih a plane axial surface is used, this latter elevation differs from that of the axis in the azimuth plane containing body M, and consequently from the elevation angle of body M. Moreover, as has already been pointed out, this difference is unimportant if the azimuth range is not too large.

Figure 2:
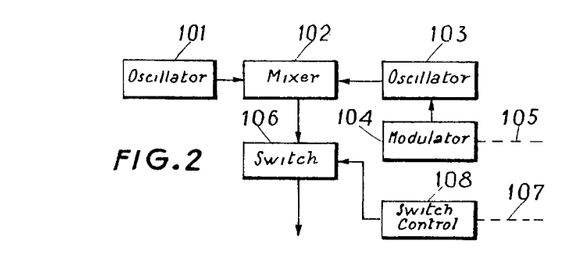
FIG. 2 is a block-diagram of one embodiment of a transmitter unit according to the invention.

Signal B is provided by a transmitter, preferably comprising the circuit illustrated in FIG. 2.

In this figure, an oscillator 101 operates at a fixed frequency in the intermediate frequency range and an oscillator 103, provided with automatic amplitude control which maintains constant its amplitude, also operates in this frequency range and is frequency modulated, for example by varying a mechanically variable impedance by means of a device 104, which is controlled in accordance with the motion of the lobe by means of a suitable mechanical or electromechanical connection 105.

The outputs of oscillators 101 and 103 are respectively fed to the two imputs of a substractive mixer 102 delivering a low frequency signal B, which has the same frequency swing as oscillator 103.

It is of course also possible to modulate in frequency a low-frequency oscillator delivering signal B directly, but in this case the frequency swing which it is possible to obtain, and consequently the accuracy of the system, are lower. The output signal of mixer 102 is, in the example considered, used for amplitude modulating a high-frequency oscillation, with a modulation index of 100%, only during the ascending motion of the lobe.

To this end, the connection between mixer 102 and the amplitude modulator (not shown) comprises an electronic switch 106 which blocks the transmission during the downward motion periods, this switch being controlled in synchronism with the lobe displacement, by means of a voltage delivered by a device 108 connected to the antenna by a mechanical or electro mechanical connection 107.

Figure 3:
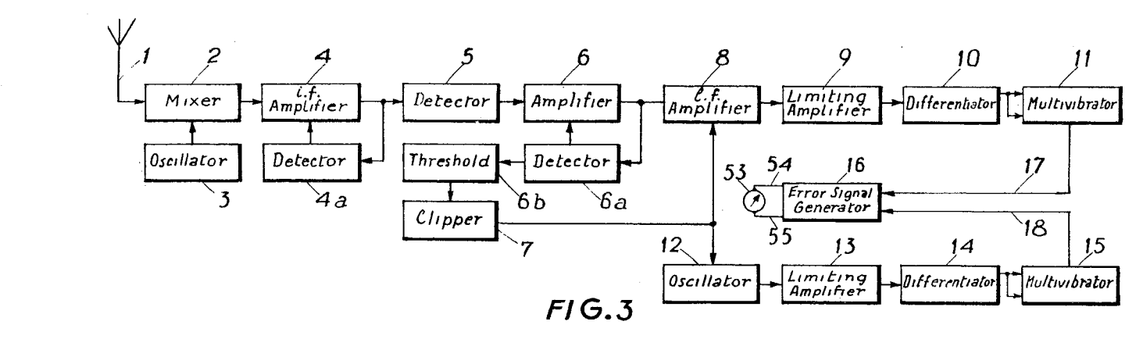
FIG. 3 is an embodiment of a receiver according to the invention.

The carrier wave at 4000 mc./s., modulated by the signal B, is radiated by means of the antenna which scans the space as mentioned above. FIG. 3 is a block diagram of a receiver located on board airplane M. An antenna 1 feeds a mixer 2, which is also fed by a local oscillator 3. Mixer 2 is followed by an intermediate frequency amplifier 4. Amplifier 4 feeds a detector 4a, the output signal of which is applied to an electrode of amplifier 4 to obtain an automatic gain control, and a detector 5. Detector 5 is followed by a low frequency amplifier 6 the output of which feeds in parallel another low-frequency amplifier 8, which is normally blocked, and a detector 6a. Detector 6a is connected to an electrode of amplifier 6 to obtain an automatic gain control and to a threshold device 6b, followed by a circuit 7, including an amplifier and a clipper, the output of which is connected to an electrode of amplifier 8 in order to control the unblocking thereof.

Amplifier 8 feeds a circuit comprising in series a limiting-amplifier 9, a differentiator 10 and a monostable multivibrator 11, having two inputs, which are fed in parallel by the output of circuit 10, and one output.

As oscillator 12, whose oscillating frequency may be selected within the frequency band covered by the instantaneous frequencies of signal B, is normally blocked and comprises, as amplifier 8, an electrode connected to the output of clipper 7, which insures its temporary unblocking The output of oscillator 12 feeds a circuit, similar to that fed by amplifier 8 and comprising a limiting amplifier 13, a differentiator 14 and a monostable multivibrator 15 with two inputs and one output.

The outputs of multivibrators 11 and 15 feed respectively the two inputs 17 and 18 of an integrating subtracting and averaging device 16 which delivers between its terminals 54 and 55 an error voltage derived from the signals applied thereto by multivibrators 11 and 15. An embodiment of device 16 is given below with reference to FIG. 5. An indicator device 53 is connected between terminals 54 and 55.

This receiver shown in FIG. 3 operates as follows:

Assuming that the lobe is moving upwards and calling the initial instant of this motion $t_1=0$, airplane M is covered by the lobe between the instants at which $S=S_0-2$ and $S=S_0+2$, the angles being expressed in degrees, i.e. between the instants $T_1=(S_0-4)/b$ and $T_2=S_0/b$.

Figure 4:
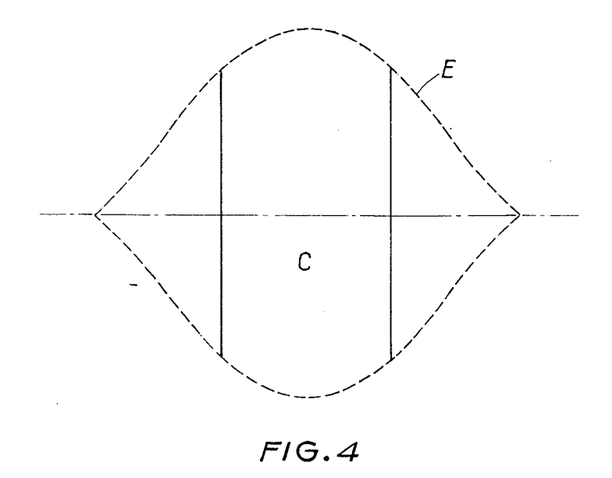
FIG. 4 is an explanatory graph.

This signal is picked up by aerial 1 and translated to the intermediate frequency level by means of mixer 2. The automatic gain control of the intermediate frequency amplifier 4 has a sufficiently high time constant for the maximum reception level to be maintained constant from one sweeping of the airplane by the lobe to the next. The intermediate frequency signal obtained at each scanning presents, for the portion corresponding to the useful lobe of th transmission antenna, a general envelope E, the aspect of which is indicated in FIG. 4 and whose shape depends on that of the radiating lobe of the transmission antenna in the azimuth plane.

The term "general envelope" is used to designate the locus of the relative maxima of amplitudes of the intermediate frequency oscillations.

Each one of these relative maxima corresponds to a peak of the low-frequency signal.

On the edges of the signal, the levels of these relative maxima may prove to be rather fluctuating especially at substantial ranges. Also the antenna may present secondary lobes which produce weak signals on both sides of envelope E.

This is why, from signal E, only that portion of the low frequency signal will be kept at the low-frequency level, which is derived from the portion C of the intermediate frequency signal for which the relative maxima are less than 3 db below the absolute maximum, i.e. the intermediate frequency oscillation amplitude corresponding to a peak of the modulating signal received during the sweeping of the craft by the axial surface of the beam. This boils down to keeping from the signal received between instants $T_1$ and $T_2$, as defined hereinabove, only that fraction which is received between instants $$T'_1=(S_0-3)/b \text{ and } T'_2=(S_0-1)/b$$

The output signal of amplifier 4 is detected in detector 5, and is then again amplified by the low frequency amplifier 6, whose automatic gain control, performed by means of detector 6a, completes that of the automatic gain control of amplifier 4, performed by means of detector 4a.

The low-frequency output signal of amplifier 6 is detected by detector 6a, the output signal of which presents, in the absence of secondary lobes, a shape corresponding to the upper half of the envelope E of FIG. 4. The threshold device 6b is adjusted to pass only the peak of the portion of the output signal of detector 6a corresponding to portion C of the envelope E of the I.F. signal (FIG. 4). This signal is then amplified and clipped by the clipper 7, to provide a square signal occuring between instants T'₁ and T'₂.

Oscillator 12 is adjusted by the pilot to oscilate at frequency $f_1=F(1+aS_1)$ where $S_1$ is the elevation desired for the aircraft.

The square-wave signal delivered by clipper 7 is applied simultaneously to oscillator 12 and to amplifier 8 to keep both of them unblocked between instants T'₁ and T'₂.

The signal appearing at the output amplifier 8 during this time interval is converted, in the limiting amplifier 9, into square-wave signals having alternately a positive and a negative level, respectively corresponding to the positive and negative alternations of the low-frequency signal. This square-wave signal is then differentiated by differentiator 10 which delivers a sequence of alternately positive and negative going pulses, respectively corresponding to the rise and the decay of the square-wave signal.

The total number of these pulses is double the number of low frequency cycles of modulating signal B comprised in the retained portion of the incident signal.

Due to the linear character of the lobe motion and the frequency modulation of signal B as a function of the elevation angle and, consequently, to the linearity of the frequency modulation of signal B as a function of time, the numer of pulses of a train of pulses corresponding to to scanning is equal to the number of pulses which would be obtained if, during the total period of utilization of the incident high-frequency signal, signal B were modulated at an average frequency $f_0=F(1+aS_0)$.

It is accordingly equal to $$N_0=(T'_2-T'_1)2f_0=\frac{2}{b}2f_0\frac{4f_0}{b}$$

This means that this number is comprised between 1000 ($f_0$=150 kc./s.) and 3000 ($f_0$=150 kc./s.).

The monostable multivibrator 11 is of a type which can be tripped into its semistable state by a positive pulse applied to one of its inputs or by a negative pulse applied to its other input. The positive and negative pulses delivered by circuit 10 are all applied to both inputs, the positive pulses acting only on one input and the negative pulses acting only on the other input. Thus, multivibrator 11, the duration of the semistable state of which is selected to be lower than the minimum time interval which may separate two pulses applied thereto, provides a sequence of $N_0$ positive pulses having well defined duration and level, during the time interval T'₁ to T'₂.

The output signal of oscillator 12 undergoes, in the channel 13–14–15, exactly the same operations as the output signal of amplifier 8 in channel 9–10–11, so that multivibrator 15, which is identical to multivibrator 11, provides a sequence of pulses identical to those delivered by multivibrator 11, but whose number is equal to $$N_1=\frac{4f_1}{b}$$

$f_1$ being the frequency of oscillator 12.

The output pulses of multivibrators 11 and 15 are respectively applied to the inputs 17 and 18, of device 16 which forms the difference between the integrated amounts of the electrical quantities applied to each one of its inputs 17 and 18 and derives therefrom an average voltage signal appearing between terminals 54 and 55 between which is inserted the indicator device 53 providing an error signal whose polarity and magnitude are a function of $N_0-N_1$, i.e. of $f_0-f_1$, and therefore of $S_0-S_1$.

Figure 5:
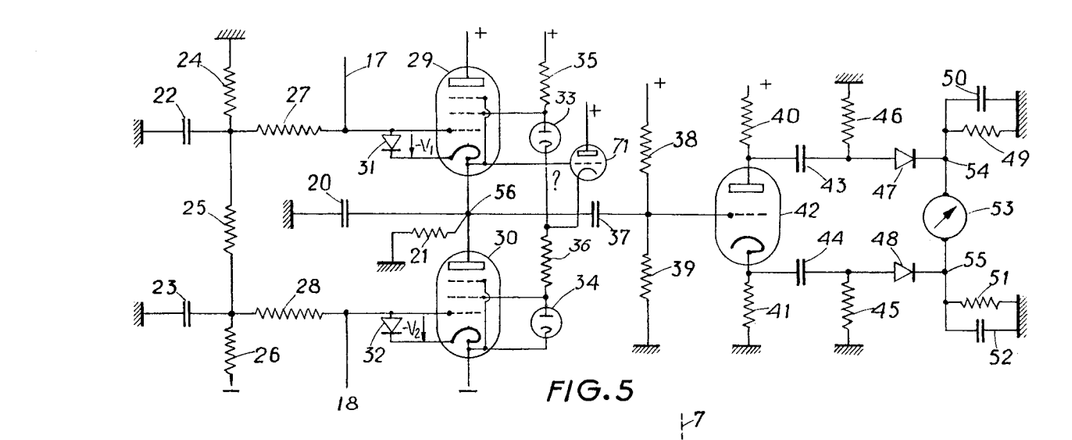
FIG. 5 shows in more detail a portion of the receiver illustrated in FIG. 3.

FIG. 5 illustrates an embodiment of device 16.

It comprises a capacitor 20 and a resistor 21 connected in parallel between a terminal 56 and ground. Terminal 56 is connected to the cathode of a pentode 29, the plate of which is connected to a source of positive voltage and to the plate of pentode 30, the cathode of which is connected to a source of negative voltage. The inputs 17 and 18 of device 16, shown in FIG. 3, are respectively connected to the control grid of pentodes 29 and 30.

A resistance bridge 24–25–26, connected between ground and a negative source, is used for suitably biasing the control grid of pentode 29, which is connected through a resistance 27 to the junction between resistances 24 and 25, and the control grid of pentode 30, which is connected by resistance 28 to the junction between resistances 25 and 26. These junction points are grounded respectively through bypass capacitors 22 and 23.

The cathode of pentode 29 is connected to its suppressor grid and coupled to its control grid through a rectifier 31, which is conductive in the direction from the grid to the cathode. In a similar manner, the cathode of pentode 30 is connected to its suppressor grid and coupled to its control grid through a rectifier 32, which conducts in the direction from the grid to the cathode.

Between a source of positive voltage and the cathode of pentode 30 is connected a series network including a resistor 35, a neon diode 33, a resistor 36 and a neon diode 34. The screen grid of pentode 29 is connected to the junction point of resistor 35 and the anode of diode 33. The cathode of pentode 29 is connected to the grid of a triode 71, whose plate is connected to a source of positive voltage and whose cathode is connected to that of diode 33. The screen grid of pentode 30 is connected to the junction point of resistor 36 and the anode of diode 34. This arrangement is such that the potential of the cathodes of tubes 71 and 33 is controlled by that of the grid of tube 71, whose potential, as that of the cathode of pentode 29, is the same as the potential of terminal 56. This arrangement brings the screen grid of pentodes 29 and 30 to positive potentials which are well defined with respect to those of their respective cathodes.

Terminal 56 is connected, through a capacitor 37, to the grid of a triode 42, the positive bias of which relative to ground is provided by the bridge formed by resistances 38 and 39 which are connected between a positive voltage source and ground.

The plate and cathode of triode 42 are respectively connected to a source of positive voltage and ground through two equal resistances 40 and 41.

The positive potential with respect to ground to which the grid of triode 42 is biased is such that this grid is negative relative to the cathode which is raised to a positive voltage on account of the automatic grid bias due to resistance 41.

An output circuit is connected to the plate of triode 42. It comprises a capacitor 43 which is grounded through a resistance 46 and a rectifier 47, followed by an integrating circuit, including a capacitor 50 in parallel with a resistance 49. The conductive direction of rectifier 47 is from the plate of triode 42 to ground. An identical circuit is connected to the cathode of the same triode 42. It includes a capacitor 44, a resistor 45, a rectifier 48, a capacitor 52 and a resistor 51 corresponding respectively to elements 43, 46, 47, 50 and 49 and having respectively the same values as the latter. Between the terminal 54, common to rectifier 47 and integrator circuit 49–50, and terminal 55, common to rectifier 48 and integrators 51–52, is connected a voltmeter 53.

The operation of the device shown in FIG. 5 is as follows:

When no signal is present at input 17, pentode 29 is blocked due to the variable negative bias $-V_1$ of its control grid with respect to its cathode, the biasing voltage applied to the grid being sufficient to block the tube for the highest negative voltage which may appear at the cathode on account of a negative charge of capacitor 20. Pentode 30 is in the same manner blocked due to the constant negative bias $-V_2$ of its control grid with respect to its cathode.

The negative bias voltage $-V_1$ and $-V_2$ make rectifiers 31 and 32 nonconductive in the absence of any incoming signal. The pulses applied to inputs 17 and 18 are made higher than the higher of the two values $V_1$ maximum and $V_2$.

When a pulse appears at one of the inputs 17 or 18, the corresponding rectifier 31 or 32 becomes conductive and the potential difference between the control grid and cathode of the corresponding pentode becomes: the applied pulse is thus clipped.

The sources of the pulses, i.e. the multivibrators 11 and 15 of FIG. 3, are selected of a high internal impedance, in order to make negligible any additional charge of capacitor 20, due to the grid current of pentode 29. Under such conditions, since the screen grids of the two pentodes are maintained at fixed and equal potentials relative to their respective cathodes and the influence of the fluctuations of the cathode-anode voltage difference of the pentodes may be entirely disregarded, the occurrence of a pulse at input 17 results in bringing a well defined positive charge $q$ through pentode 29 to capacitor 20, the corresponding charge being $-q$ upon the occurrence of a pulse at input 18.

Thus, during one sweeping of airplane M by the lobe, capacitor 20 takes up an algebraic charge $(N_0-N_1)q$. The value of resistance 21 is selected sufficiently high for the discharge of capacitor 20 through this resistance to be negligible during one sweeping of the craft, more precisely during the time interval comprised between $T'_1$ and $T'_2$, but yet low enough for capacitor 20 to discharge entirely between two pulses trains relative to two successive sweepings. A steep-front pulse, which decays exponentially, is thus collected at terminal 56 after each sweeping, its polarity being determined by the sign of $(N_0-N_1)$ and its peak value being substantially proportional to $(N_0-N_1)$, and thus, to $S_0-S_1$.

These pulses are applied through capacitor 37 to the control grid of the triode 42. Resistances 40 and 41 are equal. Capacitors 43 and 44 are low-impedance coupling capacitors. Resistance 45 and 46 have a low value with respect to resistances 49 and 51, so that rectifiers 47 and 48 are fed by sources with a low internal impedance.

Under these conditions, each input pulse applied to triode 42, gives rise at the respective outputs of capacitors 44 and 43 to equal pulses I and $-$I of opposite polarities. Pulse I, which is derived from the cathode, has the same polarity as the input pulse, and pulse $-$I, which is derived from the plate, has a polarity opposite to that of this input pulse. Rectifiers 47 and 48 pass only positive pulses, i.e. capacitor 52 is charged positively and capacitor 50 is not charged when pulses I are positive, i.e. when the pulses applied to triode 42 are positive. In the opposite case, it is capacitor 50 which is positively charged and capacitor 52 receives no charge. Thus, the sign of the output voltage Vs, which is equal to the potential at terminal 55 minus the potential at terminal 54, depends upon the respective charges of capacitors 52 and 50. The values of capacitors 50 and 52 and of resistances 49 and 51 are selected in such a manner that the output voltage Vs is a D.C. voltage with comparatively slow variations, averaging the results of a few successive sweepings. In the example described, this voltage Vs is measured by a high-impedance voltmeter. Of course voltage Vs may be used to feed any suitable display device or an automatic-piloting equipment.

It may be remarked that voltage Vs is an error signal between frequency $f_0$ and the actual frequency of oscillator 12. By substituting for manually adjustable oscillator 12 an automatically frequency controllable oscillator 12a (FIG. 6) having the same range of variation as oscillator 12 and feeding the same circuit, the error voltage Vs thus obtained may be used to lock oscillator 12a to frequency $f_0$. In this case oscillator 12a preferably oscillates permanently and is blocked only on its output by means of a gate 12b which is unblocked by the gating signal from clipper 7. The voltage Vs, tapped between terminals 54 and 55, feeds the winding of a D.C. motor 59, the direction of rotation of which reverses with the polarity of Vs and the output shaft of which controls the variation of an impedance comprised in oscillator 12. The remainder of the circuit arrangement is the same as in FIG. 3. By graduating the scale of oscillator 12a as a function of the elevation angle, an elevation indicator is thus provided.

Figure 7:
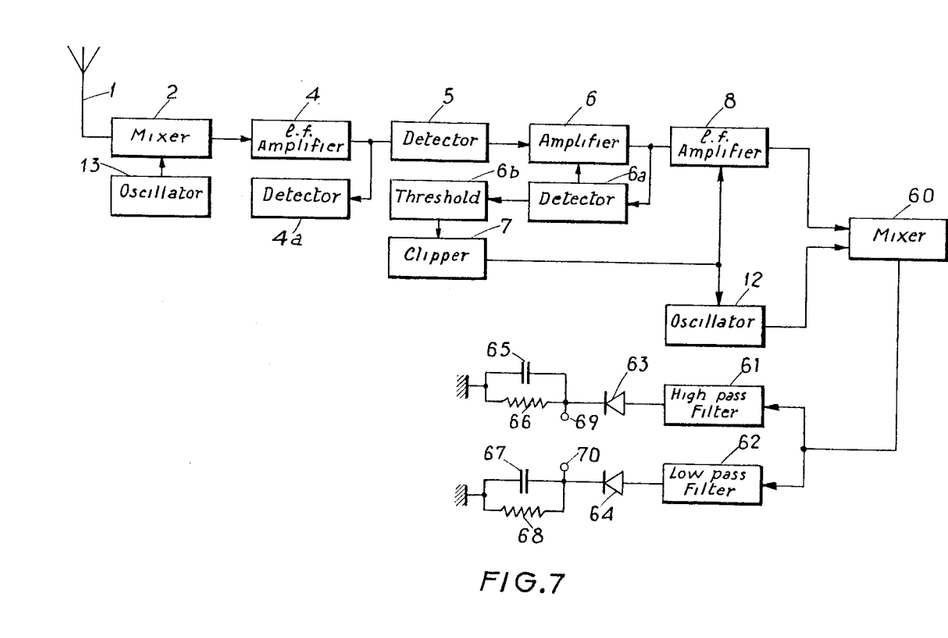
FIG. 7 is a block diagram of a further embodiment of the receiver according to the invention.

FIG. 7 shows a further embodiment of the receiver. Elements 1 to 8 are the same and play the same part as the elements of FIG. 3 designated by the same reference numbers. Consequently, at the output of the low-frequency amplifier 8 the same low-frequency signal appears between instants $T'_1$ and $T'_2$ as in the embodiment of FIG. 3.

The receiver of FIG. 7 also comprises the auxiliary oscillator 12 which is unblocked at the same time as amplifier 8, by the clipper 7. However, the operating frequency-band of oscillator 12 is not the same as in the case of FIG. 3, as will be seen below.

The output of amplifier 8 and of oscillator 12 feed a mixer 60 including a limiter. The output of mixer 60 feeds in parallel a high-pass filter 61 and a low-pass filter 62.

The high-pass filter 61 feeds a rectifier 63, between the output 69 of which and ground is inserted an integrator circuit comprising a capacitor 65 connected across a resistor 66. The low-pass filter 62 feeds an identical circuit arrangement, comprising a rectifier 64, between the output 70 of which and ground is inserted an integrator circuit including a capacitor 67 and a resistance 68. The terminals 69 and 70 between which appears, as will be shown, an error voltage, constitute the output terminals of the receiver, between which a utilization device may be connected.

The operation of this receiver is based on the use of the signal at the frequency $f-f_1$ delivered by mixer 60 which, during the time intervals $T'_1$ to $T'_2$, receives, as indicated above, the detected signal B, whose frequency is $f$, and the oscillation at frequency $f_1$ supplied by oscillator 12, $f_1$ being adjusted to be equal, to within a constant $Fk$, to the low frequency $f'_1$ corresponding to the desired elevation: $f_1=f'_1-Fk$.

Certain requirements must therefore be imposed on the various frequencies considered. Designating by $fm$ and $fM$ the values of the instantaneous frequency of signal B, respectively corresponding to the minimum elevation $Sm$ and the maximum elevation $SM$ within the space portion controlled by transmitter E, one has $$fm<f<fM$$

Under these conditions, the frequency band covered by oscillator 12, oscillating at frequency $f_1$, is defined by:

$$fm-Fk<f_1<fm-Fk$$

where the constant $Fk$ is selected such that $$fM-fm<Fk<fm \qquad (1)$$

According to the right hand part of the double inequality (1), $$fm-Fk>0$$

which is an obvious requirement.

The left hand part of the double inequality, which may be written $$fm-Fk<fm$$

expresses that the maximum value of $f_1$ is smaller than the minimum value of $f$, i.e. that the difference $f-f_1$ will always be positive.

It remains to ensure that, whatever the values of $f$ and $f_1$ in their respective variation ranges, mixer 60 will always be capable of collecting, through the output filter incorporated therein, the frequency $f-f_1$, to the exclusion of frequency $f+f_1$.

The maximum value of $f-f_1$ is $$fM-(fm-Fk)=fM-fm+Fk$$

The minimum value of $f+f_1$ is $$fm+(fm-Fk)=2fm-Fk$$

For separating these frequencies by filtering it is necessary that $$fM-fm+Fk<2fm-Fk$$

or $$fM-3fm+2Fk<0 \quad (2)$$

Let $fM=Rfm$ with $R>1$ and $Fk=rfm$
The double inequality (1) may thus be written:

$$(R-1)<r<1 \quad (3)$$

The condition (2) may be written:

$$R-3+2r<0$$

or $$r<(3-R)/2 \quad (4)$$

Since $(3-R)/2$ is always $<1$, if $R>1$; the requirements are:

$$R>1 \quad (5)$$
$$(R-1)<r<(3-R)/2 \quad (6)$$

The double inequality (6) requires that $$(R-1)<(3-R)/2, \text{ i.e. } R<5/3$$

If, for instance, $R=4/3$, which may be obtained by acting on the coefficient $a$ of the modulation law of signal B, inequality (6) becomes:

$$1/3<r<5/6$$

Taking, by way of example, $r=7/12$, $fm=120$ kc./s., $fM=160$ kc./s., $Fk=70$ kc./s., the minimum value of $f-f_1$ becomes 170 kc./s.

The cut-off frequency of the output filter of mixer 60 may then be taken equal to 140 kc./s.; $f_1$ is then made equal to the value $f'_1-Fk$, where $f'_1$ corresponds to the desired elevation.

The output signal of mixer 60 presents an instantaneous frequency $f-f_1=Fk+f-F'_1$.

When airplane M is swept by the lobe, the instantaneous frequency $f$ of signal B, between the instants $T'_1$ and $T'_2$ defined herein above, varies from $f_0-df$ to $f_0+df$, $df$ being the frequency variation corresponding, in this example, to a variation of the elevation angle by 1 degree.

It results that if $F'_1$ is lower than $f_0-df$, i.e. if the actual elevation angle $S_0$ of the airplane exceeds the desired elevation angle $S_1$ by more than 1°, all the instantaneous frequencies of the beat delivered by mixer 60 will be higher than $Fk$, and if $f'_1$ is higher than $f_0+df$, i.e. if $S_0$ is lower by more than 1° than $S_1$, all these instantaneous frequencies will be lower than $Fk$.

If $f'_1$ is comprised between $f_0-df$ and $f_0+df$, that is, if $f_0$ is comprised between $f'_1-df$ and $f'_1+df$, the frequency intervals covered by the instantaneous frequencies, respectively higher and lower than $Fk$, of the output signal of mixer 60, will be $f_0+df-f'_1$ and $f'_1-f_0+df$, respectively.

The cut-off frequencies of the high-pass and low-pass filters 61 and 62 are thus taken equal to $Fk$.

The output signals of the two filters are respectively rectified by detectors 63 and 64 and are used to charge the integrator circuits 65–66 and 67–68 respectively.

Assuming filters 61 and 62 to pass effectively only the frequencies higher and lower than $Fk$, the following results obtain:

For $f_0>f'_1-df$, i.e. $S_0>S_1+1$, capacitor 65 receives a charge Q during one sweeping of airplane M and capacitor 67 receives no charge.

For $f_0<f'_1-df$, i.e. $S_0<S_1-1$, capacitor 67 receives charge Q and capacitor 65 no charge.

For $f'_1-df<f_0<f'_1+df$, i.e. $S_1-1<S_0<S_1+1$, taking into account the linearity of the frequency modulation of signal B as a function of time, and, the fact that the amplitude of the output signal of the mining and limiting circuit 60 is substantially constant, the difference between the charges collected by the capacitors 65 and 63 is proportional to the difference between the frequency intervals defined hereinabove, i.e. $(f_0+df-f'_1)-(f'_1-f_0+df)=2(f_0-f'_1)$.

The difference between these charges will thus vary linearly between Q and $-Q$, when $S_0$ varies between $S_1+1$ and $S_1-1$.

In fact, since it is impossible to have filters with steeply defined cut-off frequencies, the conditions as defined above are fulfilled only approximately, but the difference between the charges taken up by capacitors 65 and 67 is of the same sign as $S_0-S_1$ and approximately proportional to $S_0-S_1$ in the range $S_1-1<S_0<S_1+1$.

The values of capacitors 65 and 67 and of the resistances 66 and 68 are selected in such a manner that the potential difference $Vs$ between the potential at terminal 69 and the potential at terminal 70, is a substantially continuous voltage averaging the results a few successive sweeping of the craft. An utilization apparatus may then be connected between terminals 69 and 70.

For a better understanding of the operation, it has been assumed herein that the constants of the system were selected to have the difference $f-f_1$ always positive. It is readily seen that $f-f_1$ may vary in a range including a negative portion, provided the frequencies $f_1-f$, which will then be delivered instead of $f-f_1$ by mixer 60, still pass through the low-pass filter 62 and not through the high-pass filter 61. The requirement is then that the absolute value of $f-f_1$ corresponding to its lowest algebraic value, i.e.:

$$|fm-(fM-Fk)|=fM-fm-Fk$$

should be lower than $Fk$, i.e.

$$\frac{fM-fm}{2}<Fk$$

The double inequality (1) is then substituted by:

$$\frac{fM-fm}{2}<Fk<fm$$

or, using the former notations:

$$\frac{R-1}{2}<r<1$$

the inequality (6) being substituted by $$\frac{(R-1)}{2}<r<\frac{(3-R)}{2}$$

which requires that $R<2$, which leaves a greater freedom than the condition $$R<\frac{5}{3}$$

corresponding to the case where frequencies $f-f_1$ are always positive.

It is to be understood that many variations may be brought to the system described within the scope of the invention.

Thus, signal B might be converted at the transmission end into alternately positive and negative square signals, in order to cause the carrier to be modulated by a rectangular rather than by a sinusoidal signal.

Also, the carrier may be frequency modulated by signal B, although such a solution would appear to be less advantageous.

In the described examples:

Signal B was linearly modulated as a function of the elevation angle of the scanning lobe, The scanning speed, i.e. rotation speed of the lobe during the scanning, was constant, The 3 db-aperture in elevation of the scanning lobe was constant.

Figure 6:
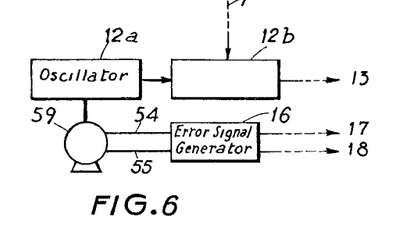
FIG. 6 illustrates an alternative embodiment of the receiver in FIG. 3.

It has been shown that under these conditions, the error signal obtained in the receivers of FIGS. 3 and 6 varied only with the absolute error, i.e. the difference between the elevation corresponding to the central instantaneous frequency of signal B during the time interval T'₁ to T'₂ (i.e. its instantaneous frequency at the intermediate instant of the time interval T'₁ to T'₂, in other words at the instant taken the aircraft was swept by the axial surface of the lobe) and the elevation corresponding to the frequency of the oscillator 12 or 12a.

It is, however, possible to depart from the aforesaid characteristics, while still using the receivers of FIGS. 3 and 6 which may, for example, operate with an error signal which is a function not only of the error, but also of the elevation angle of the aircraft.

For reasons associated with sensitivity, it may for example be preferable to modulate signal B according to a logarithmic law $f=F$ (log $pS$), where $p$ is constant, which will make $\Delta f$ proportional $\Delta S/S$. It is still possible to use a receiver of the type illustrated in FIG. 3, if the aperture in elevation of the lobe is small relative to the smallest elevation angle to be measured, thus making it possible to consider the central instantaneous frequency of the low frequency signal B as equal to its average frequency.

By "average frequency" is meant the frequency resulting from dividing the number of cycles of signal B during the time interval T'₁ to T'₂ by the duration of this time interval.

It is also possible to vary the scanning speed as a function of the elevation angle of the lobe; the speed should not vary so rapidly that it would no longer be possible to consider it as constant during the time interval T'₁–T'₂.

Of course, the period of the scanning is then preferably kept constant so that, the aircraft is still swept at time intervals which are substantially constant and independent of its elevation angle.

Again the lobe aperture in elevation of the lobe may be suitably varied as a function of the elevation angle of the lobe, this having, as the preceding modification, the result that the duration from T'₁ to T'₂, to which the error signal is proportional for a given error, varies as a function of the elevation angle of the aircraft.

All these modifications may be applied separately or in combination in the transmitting station, while still using the receivers of FIGS. 3 and 6. However, it is important that the average frequency of signal B, as defined above, be with a sufficient approximation equal to the instantaneous frequency of signal B at the instant when the aircraft is swept by the axial surface of the lobe.

It is also possible to modulate the beam during both its upward and downward motion, in order to increase the information frequency, but this solution complicates the receiver, since the successive scannings of the target will be no longer separated by equal time intervals.

The minimum coverage in elevation is a function of the sharpness of the beam used. To eliminate the influence of the ground, the minimum elevation must be equal to the half-width of the beam in elevation, say to 2° for a 4° aperture of the lobe in elevation.

Various modifications may of course be brought to the receiver as to the determination of the central frequency $f_0$ of the low-frequency train detected, the examples given being preferred embodiments.

The system may, of course, be used for the measuring of azimuth angles with respect to a reference vertical plane by means of a continuous scanning, the lobe being always rotated in the same direction, or by means of an oscillating azimuth scanning.

A plane axial surface will be generally used here; accordingly the lobe will be symmetrical with respect to a vertical plane of maximum radiation, which plane rotates about the vertical axis passing through the origin of the lobe, this motion allowing it to scan all the azimuth or a given azimuth sector. In this case, the maximum radiation directions for the different angles of elevation have the same azimuth which is that of the axial plane.

Two independent transmitter and receiver stations may be provided to combine azimuth and elevation measurements.

It is, however, possible to reduce the amount of material on board by using two transmitter stations employing the same carrier frequency and different instantaneous frequency ranges for their respective low-frequency signals and transmitting alternately. The elevation transmitter has its carrier modulated during the upward motion of the lobe, which is suppressed during the downward motion, and the azimuth transmitter radiates its lobe only when the elevation transmitter does not, the elevation and azimuth beams being transmitted in alternation.

The receiver station on board may then use a common antenna and stages common to both systems up to the output of the first low frequency detector, i.e. detector 5 in FIG. 3, after which the receiver divides into distinct channels by means of low-frequency pass-band filters which are connected to the output of the detector.

What is claimed is:

1. A receiver for receiving, during time intervals occurring with a substantially constant repetition frequency, a carrier wave which is amplitude modulated by a frequency modulated wave and transmitted as a moving beam the reception level of said carrier wave being modulated in the course of each of said time intervals by the motion of the beam and being maximum at the intermediate instant of said time intervals, said receiver comprising: means for receiving said carrier-wave; means for demodulating said carrier wave to obtain a frequency modulated signal constituted by said frequency modulated wave, additionally amplitude modulated by said motion of said beam; automatic gain control means for maintaining substantially constant the maximum amplitude of said frequency modulated signal for each of said time intervals; means for amplitude detecting said frequency modulated signal; means for deriving from said amplitude detected signal a gating signal, the duration of which corresponds to the interval of time during which said amplitude detected signal is above a predetermined level; a normally blocked oscillation source having the same frequency variation range as the possible various instantaneous frequencies of said frequency modulated wave; a normally blocked low frequency amplifier; means for applying said frequency modulated signal to said low frequency amplifier; means for applying said gating signal to said low frequency amplifier and to said source to unblock them during the duration of said gating signal; means for deriving from the output signal of said low frequency amplifier a first series of pulses whose number is a predetermined function of the number of cycles contained in said output signal of said low frequency amplifier; means for deriving from the output signal of said oscillation source a second series of pulses whose number is said predetermined function of the number of cycles contained in the output signal of said source an integrating and subtracting device having two inputs and an output, forming the difference between the integrated quantities of electricity respectively applied to its two inputs; and means for applying said first and second pulsed signals respectively to said two inputs to obtain on said output an error signal between the central instantaneous frequency of the output signal of said low amplifier and the operating frequency of said oscillation source.

2. A receiver for receiving, during time intervals occurring at a substantially constant repetition frequency, a carrier wave which is amplitude modulated by a frequency modulated wave and transmitted as a moving beam, the reception level of said carrier wave being modulated in the course of each of said time intervals by the motion of the beam and being maximum at the middle-point of said time intervals, said receiver comprising: means for receiving said carrier-wave; means for demodulating said carrier wave to obtain a frequency modulated signal constituted by said frequency modulated wave, additionally amplitude modulated through said motion of said beam; automatic gain control means for maintaining substantially constant the maximum amplitude of said frequency modulated signal of each of said time intervals; means for amplitude detecting said frequency modulated signal; means for deriving from said amplitude detected signal a gating signal, the duration of which corresponds to the time interval during which said amplitude detected signal is above a predetermined level; a variable oscillator having the same variation range as the possible various instantaneous frequencies of said frequency modulated wave, said oscillator having a frequency control input and an output connected to a gating circuit; a normally blocked low frequency amplifier; means for applying said frequency modulated signal to said low frequency amplifier; means for applying said gating signal to said low frequency amplifier and to said gating circuit to unblock them during the duration of said gating signal; means for deriving from the output signal of said low frequency amplifier a first series of pulses; means for deriving from the output signal of said gating circuit a second series of pulses; an integrating and subtracting device having two inputs and an output, and forming the difference between the integrated quantities of electricity respectively applied to its two inputs; means for applying said first and second series of pulses respectively to said two inputs to obtain on said output an error signal between the central instantaneous frequency of the output signal of said low amplifier and the operating frequency of said variable oscillator; and means for applying said error signal to said frequency control input.

3. A receiver for receiving, during time intervals occuring at a substantially constant repetition frequency, a carrier wave which is amplitude modulated by a frequency modulated wave and transmitted under the form of a moving beam, the reception level of said carrier wave being modulated in the course of each of said time intervals by the motion of the beam and being maximum at the middle-point of said time intervals, said receiver comprising: means for receiving said carrier-wave; means for demodulating said carrier wave to obtain a frequency modulated signal constituted by said frequency modulated wave, additionally amplitude modulated through said motion of said beam; automatic gain control means for maintaining substantially constant the maximum amplitude of said frequency modulated signal for each of said time intervals; means for amplitude detecting said frequency modulated signal; means for deriving from said amplitude detected signal a gating signal, the duration of which corresponds to the time interval during which said amplitude detected signal is above a predetermined level; a normally blocked oscillation source having the same variation range, to within a substractive constant F$k$, as the possible various instantaneous frequencies of said frequency modulated wave; a normally blocked low frequency amplifier; means for applying said frequency modulated signal to said low frequency amplifier; means for applying said gating signal to said low frequency amplifier and to said oscillation source to unblock them during the duration of said gating signal; a mixer having two inputs and an output; means for applying the output signals of said low frequency amplifier and of said source respectively to said two inputs to obtain a signal whose instantaneous frequency is equal to the difference between the instantaneous frequency of said output signal of said low frequency amplifier and the operating frequency of said oscillator; a high pass filter and a low pass filter whose common limiting frequency is equal to said constant F$k$; means for applying the output signal of said mixer in parallel to said two filters; means having an output for detecting and integrating the output signal of said high pass filter; means having an output for detecting and integrating the output signal of said low pass filter; the voltage appearing between the respective outputs of said detecting and integrating means constituting an error signal between the central instantaneous frequency of said output signal of said low frequency amplifier and the operating frequency of said output signal of said oscillator.

4. A receiver for receiving a carrier wave during recurrent time intervals, said carrier wave being modulated by a frequency modulated signal and transmitted under the form of a moving beam, the reception level of said carrier wave being modulated by the motion of said beam and having a maximum in the course of each of said time intervals, said receiver comprising: means for receiving said carrier wave; means for demodulating said carrier wave to obtain a frequency modulated signal; means for deriving from said carrier wave a gating signal centered on said maximum; gating means controlled by said gating signal, said gating means having an output; means for applying said frequency modulated signal to said gating means; and means for deriving from the output signal of said gating means a signal which is a function of the average frequency of said output signal.

References Cited by the Examiner
UNITED STATES PATENTS

| 2,257,320 | 9/41 | Williams | 343—102 |
| 2,883,662 | 4/59 | Rodgers | 343—102 |

FOREIGN PATENTS

| 1,260,282 | 3/61 | France. |
| 540,185 | 10/41 | Great Britain. |

CHESTER L. JUSTUS, *Primary Examiner.*